United States Patent [19]

Kawanishi et al.

[11] Patent Number: 4,874,048

[45] Date of Patent: * Oct. 17, 1989

[54] LOADING AND WEIGHING STRUCTURE FOR COMBINATION WEIGHING MACHINE

[75] Inventors: Shozo Kawanishi, Kobe; Tadashi Higuchi, Akashi, both of Japan

[73] Assignee: Yamato Scale Company, Limited, Akashi, Japan

[*] Notice: The portion of the term of this patent subsequent to May 6, 2097 has been disclaimed.

[21] Appl. No.: 46,833

[22] Filed: May 4, 1987

[30] Foreign Application Priority Data

May 21, 1986 [JP] Japan ................ 61-77470[U]

[51] Int. Cl.⁴ .................. G01G 13/00; G01G 13/16
[52] U.S. Cl. .................. 177/25.18; 177/103; 177/108
[58] Field of Search ............ 177/25.18, 103, 108–110

[56] References Cited

U.S. PATENT DOCUMENTS 3,783,957  1/1974  Borghi ..................... 177/103 X
4,616,722 10/1986  Moran ..................... 177/25.18 X
4,706,766 11/1987  Yamano et al. ............. 177/25.18

FOREIGN PATENT DOCUMENTS 60-17419  2/1985  Japan .
60-17420  2/1985  Japan .

Primary Examiner—George H. Miller, Jr.
Attorney, Agent, or Firm—Senniger, Powers, Leavitt and Roedel

[57] ABSTRACT

A combination weighing machine structure including a feed hopper and an underlying weigh hopper, in which the weigh hopper has two chambers laterally partitioned side by side and the feed hopper is adapted to move laterally and selectively to above either chamber. The weigh hopper is provided with a weighing unit for producing an electric signal indicative of the weight of product in both chambers and the weighing unit is arranged to provide the weight of product in each chamber for storage by measuring first the weight of product in one chamber when only this chamber is filled, measuring the total weight of product in both chambers when the other chamber is also filled and calculating the difference of both weights.

3 Claims, 5 Drawing Sheets

LOADING AND WEIGHING STRUCTURE FOR COMBINATION WEIGHING MACHINE

BACKGROUND OF THE INVENTION

This invention relates generally to a combination weighing machine and, more particularly, to a product feeding and weighing structure for such a machine.

It is a common practice to increase the number of weigh hoppers for improving the accuracy of combination weights in a combination weighing machine. However, it is not always necessary to provide each weigh hopper with a feed hopper for feeding product to the weigh hopper since each weigh hopper is not emptied every combination cycle. Therefore, it has been proposed to associate a single feed hopper with a plurality of weigh hoppers. Japanese utility model opening gazette Nos. 60-17419 and 60-17420 disclose such product feeding and weighing structures. In the disclosed structures, each of the weighing heads includes a pair of weigh hoppers arranged side-by-side and a common feed hopper disposed above these weigh hoppers. The feed hopper is arranged to move between the pair of weigh hoppers to feed product selectively to either one which has been unloaded and is thus empty.

However, the disclosed structures have disadvantages. For example the increased number of weigh hoppers also increases the number of expensive delicate weighing units. Also the distance between the weigh hoppers of each pair requires a substantial travel time for the feed hopper, which results in undesirable reduction in the machine operation speed.

SUMMARY OF INVENTION

Accordingly, an object of this invention is to provide an improved product feeding and weighing structure which does not have the abovementioned disadvantages of the prior art structures.

In accordance with this invention, there is provided a product feeding and weighing structure for a combination weighing machine, comprising a weigh hopper having a partition therein dividing the hopper into two chambers, a feed hopper disposed above the weigh hopper having discharge gate means adapted for opening to feed the contents of the feed hopper into either of the two chambers of the weigh hopper, and means for selectively effecting substantially linear horizontal movement of the feed hopper in one direction with respect to said partition for feeding the contents of the feed hopper through said discharge gate means into one chamber of the weighing hopper and in the opposite direction with respect to the partition for feeding the contents of the feed hopper through said discharge gate means into the other chamber of the weighing hopper.

In another embodiment of the invention, the product and weighing structure comprises:

a weigh hopper having a partition therein dividing the hopper into two chambers, a feed hopper disposed above the weigh hopper having a normally closed outlet port, and means mounting the feed hopper for pivotal movement about a generally horizontal axis between a first position in which the outlet port of the feed hopper is disposed for feeding of the contents of the feed hopper into one of the chambers of the weigh hopper and a second position in which the outlet port is disposed for feeding of the contents of the feed hopper into the other of the chambers of the weigh hopper.

These and other objects and features of this invention will be described in detail below with reference to the accompanying drawings.

BRIEF DESCRIPTION OF DRAWINGS

Throughout the drawings, the same reference numerals are given to like structural components.

DETAILED DESCRIPTION

Figure 1:
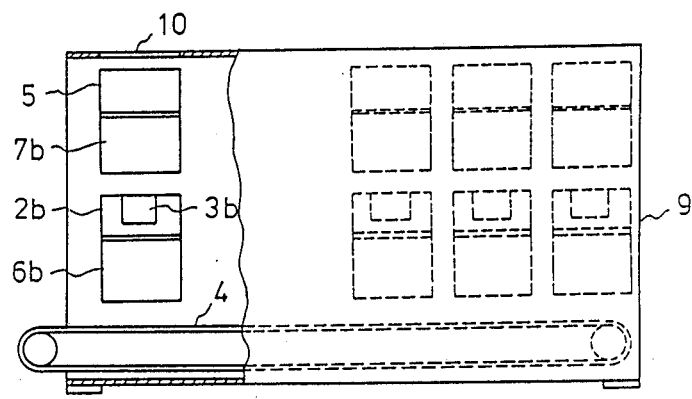
FIG. 1 is a partial sectional side view of a combination weighing machine provided with prior art product feeding and weighing structures.
Figure 2:
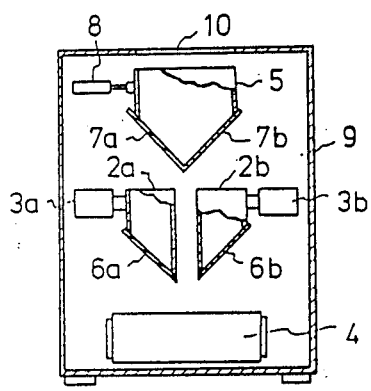
FIG. 2 is a sectional front view of the combination weighing machine of FIG. 1.

Referring to FIGS. 1 and 2, a combination weighing machine of the type as shown in the afore-cited Japanese utility models includes plural pairs of weigh hoppers 2a and 2b provided with respective units 3a and 3b such as load cells and arranged in linear formation above a belt conveyer 4, and a plurality of feed hoppers 5 disposed above the weigh hoppers 3a and 3b, one feed hopper for each pair of weigh hoppers. The weigh hoppers 2a and 2b have discharge gate doors 6a and 6b, respectively, and each feed hopper 5 has two loading gate doors 7a and 7b which are adapted to open selectively. An air cylinder 8 is coupled to the feed hopper 5 for moving the feed hopper 5 horizontally between the weigh hoppers 2a and 2b. The arrangement is such that when the weigh hopper 2a is unloaded to become empty, the feed hopper 5 is moved some distance leftward in FIG. 2 and the gate door 7a is opened to feed the contents of the feed hopper to the weigh hopper 2a, and when the weight hopper 2b is unloaded, the feed hopper 5 is moved to the right and the gate door 7b is opened to unload the contents of the feed hopper into the weigh hopper 2b. The weigh hoppers 2a, 2b, feed hoppers 5 and other components are contained in a housing 9 and product is fed to emptied feed hoppers 5 manually through openings 10 formed in the top wall of the housing 9.

In operation, all the feed hoppers 5 are moved independently by a control device, not shown, to load all weigh hoppers 2a and 2b with product, and a well-known combination selecting operation is effected to select an optimum combination of weigh hoppers. The selected weigh hoppers are then unloaded and the discharged product is collected by the conveyer 4 and delivered for packing.

Figure 4:
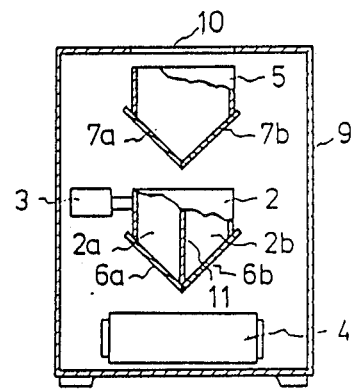
FIG. 4 is a sectional front view of the combination weighing machine of FIG. 3.
Figure 3:
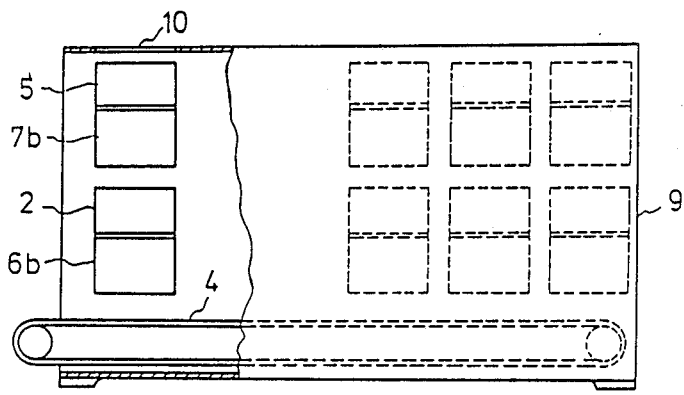
FIG. 3 is a partial sectional side view of the combination weighing machine of FIG. 1 provided with product feeding and weighing structures according to this invention.

In contrast, as shown in FIGS. 3 and 4, a combination weighing machine according to this invention includes a plurality of weigh hoppers 2 arranged in a line and corresponding feed hoppers 5 disposed above respective weigh hoppers 2. Each weigh hopper 2 has two chambers 2a and 2b separated by a vertical partition or wall 11 and is associated with a single weighing unit 3 which provides a weight signal indicative of the total weight in both chambers 2a and 2b. The operation of this inventive device is similar to that of the above-described prior art device and will be described later with reference to some embodiments thereof.

Figure 5:
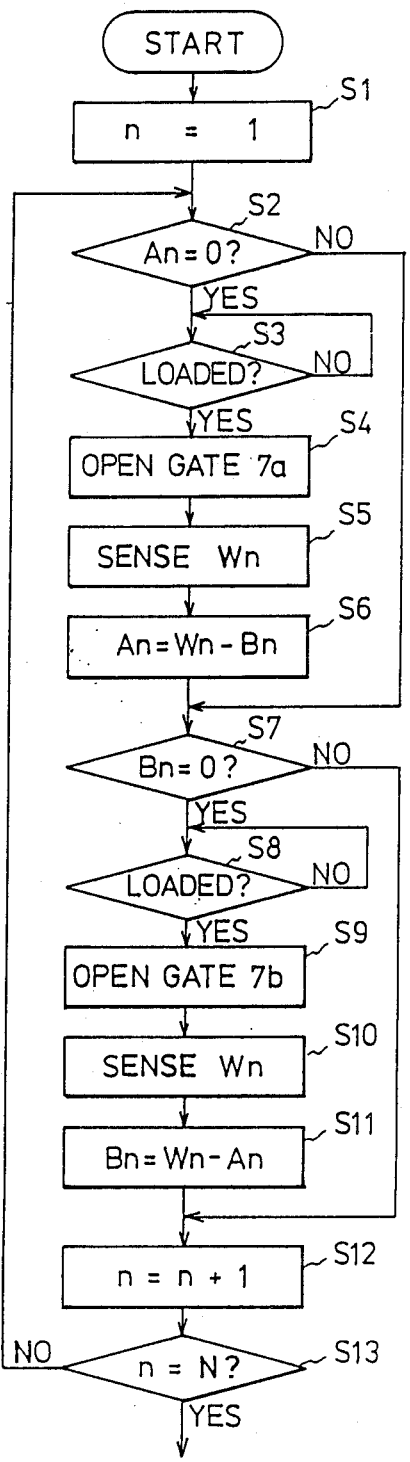
FIG. 5 is a flow chart provided for explaining a loading and weighing operation program to be executed by the structure according to this invention.

The weights of product in the chambers 2a and 2b of weigh hopper 2 are obtained by a microcomputer (not shown) in accordance with an operation program as shown in FIG. 5. The count "n" of a counter associated with the microcomputer is set first to "one" in step S1. Serial identification numbers are previously given to the weigh/feed chamber sets and one of these sets is specified by this count "n" ($=1, 2, 3, \ldots N$). It is inquired in the next step S2 whether the content of an An-memory is zero or not. The An-memory (now, $n=1$) is associated with the microcomputer for storing the weight of product in the chamber 2a of the n-th weigh hopper 2 and the content of zero indicates that the specified chamber 2a is empty. If YES, therefore, it is further inquired whether the n-th feed hopper 5 has been loaded or not in step S3 and, if the answer is NO, the step is repeated until YES is obtained. This judgement may be effected for example by a photoelectric detector (not shown) associated with each feed hopper 5. If the specified feed hopper has been loaded, the loading gate 7a is opened to feed the contents of the feed hopper into the empty chamber 2a in step S4 and the weight Wn (now, W1) is sensed by the corresponding weighing unit 3 in step S5. In the next step S6, the content Bn (now, B1) of a Bn-memory associated with the microcomputer for storing the weight of product in the chamber 2b of the specified weigh hopper is subtracted from the sensed weight Wn (now, W1) to obtain the weight of product in the adjoining chamber 2a which is stored in the An-memory (now, $n=1$).

In the next step S7, it is inquired whether the content of Bn-memory (now, $n=1$) is zero or not. This step is also executed when the answer in step S2 is NO. The succeeding steps S8 to S11 are similar to the above-described steps S3 to S6 except that they are executed for obtaining the weight of production in the adjoining chamber 2b to be stored in the Bn-memory (now, $n=1$). Thus, the weights of product in both chambers 2a and 2b of the first weigh hopper have been obtained and stored and then the n-counter is incremented by one in step S12 for obtaining the weights in both chambers 2a and 2b of the (n+1)th (now, second) weigh hopper. It is inquired in step S13 whether the count "n" has reached "N" or not and the same operation is repeated until YES is obtained, that is, until the weights of all weigh hoppers are obtained.

Figure 6:
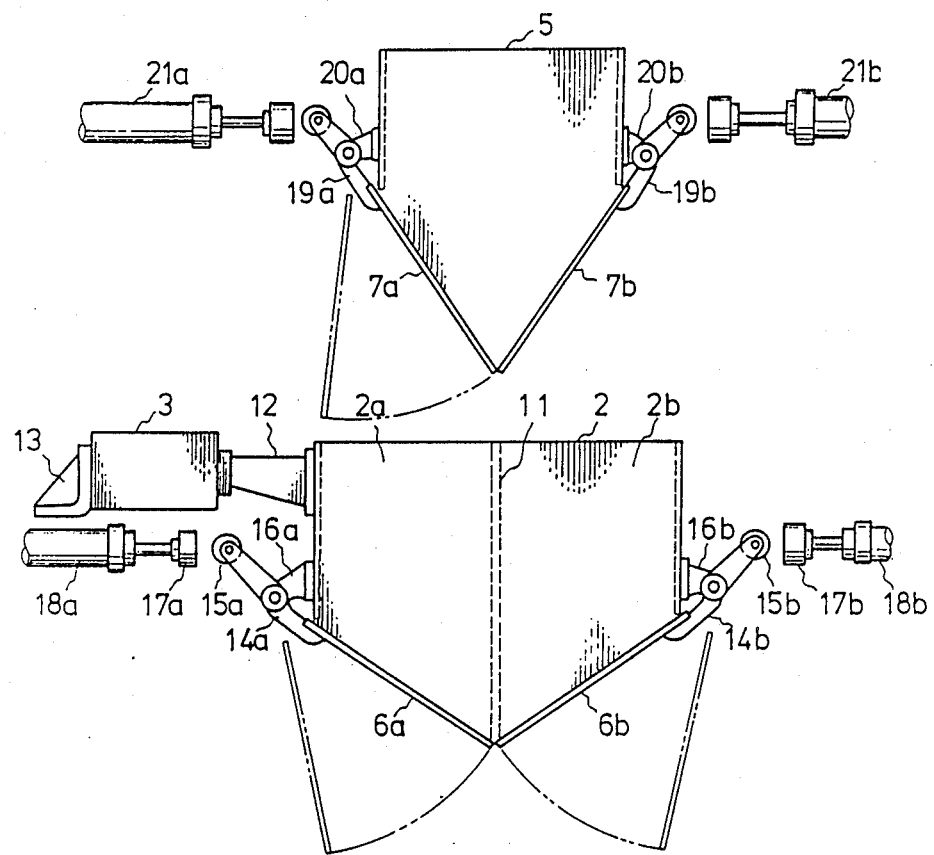
FIG. 6 is a front view of a first embodiment of the product feeding and weighing structure according to this invention.

FIG. 6 shows a detailed structure of the weigh hopper 2 and feed hopper 5 of the inventive weigh/feed hopper set of FIGS. 3 and 4. The weigh hopper 2 is connected by means of a bracket 12 to a load cell structure 3 which is fixed to a machine frame 13. The discharge gate doors 6a and 6b of the weigh hopper 2 are fixed to respective ends of levers 14a and 14b having rollers 15a and 15b at their other ends. Levers 14a and 14b are pivotably supported by brackets 16a and 16b fixed to the side walls of the weigh hopper 2. The rollers 15a and 15b face respective pusher heads 17a and 17b of air cylinders 18a and 18b, so that the doors 6a and 6b are opened independently when the air cylinders 18a and 18b are actuated individually. The loading gate doors 7a and 7b of the feed hopper 5 are similarly supported by levers 19a and 19b and brackets 20a and 20b on the side walls of the feed hopper 5, and the doors are arranged to be opened by respective air cylinders 21a and 21b. Though not shown in the drawing, suitable spring means are provided for keeping the doors 6a, 6b, and 7a and 7b normally closed.

Figure 7:
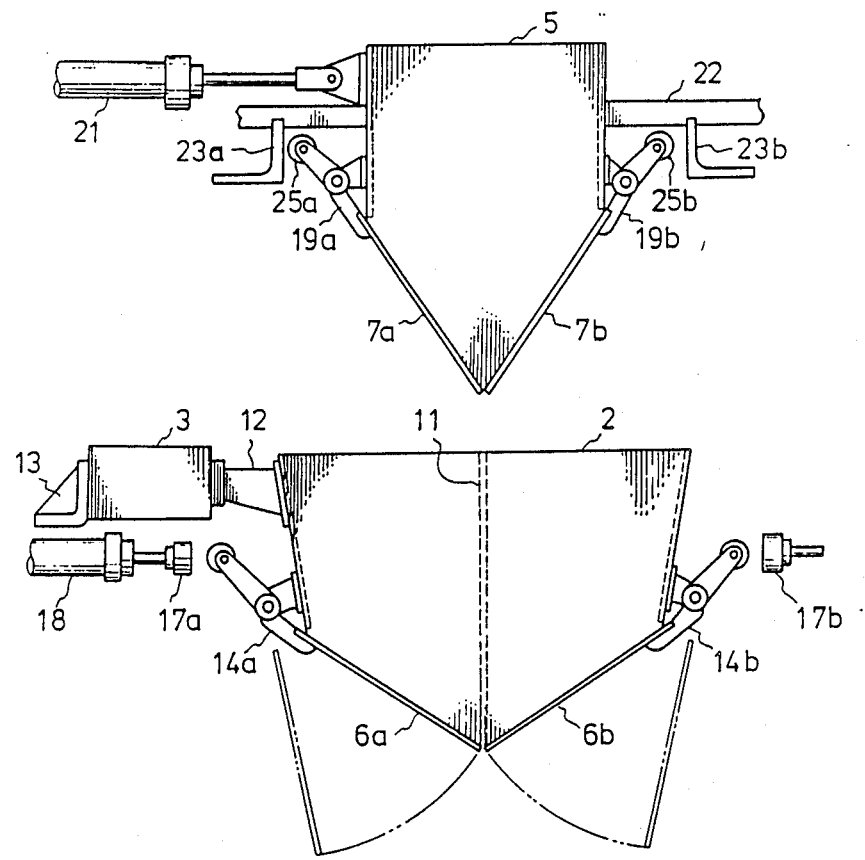
FIG. 7 is a front view of a second embodiment of the product feeding and weighing structure according to this invention.
Figure 8:
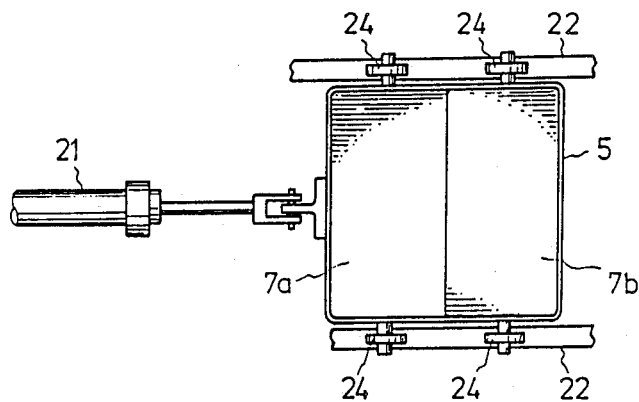
FIG. 8 is a plan view of the feed hopper of the embodiment of FIG. 7.

FIGS. 7 and 8 show a second embodiment of a feed/weigh hopper set which is similar to that of the first embodiment of FIG. 6. In this embodiment, the feed hopper 5 is movable linearly along a pair of horizontal guide rails 22 supported by machine frames 23a and 23b, while the weigh hopper 2 is exactly same as that of the first embodiment. As shown in FIG. 8, the feed hopper 5 has four wheels or rollers 24 which roll on the pair of rails 22 and is moved some distance rightward and leftward by an air cylinder 21. As will be understood from the drawing, a roller 25a attached to the free end of the door lever 19a collides against the frame 23a to open the door 7a when the feed hopper 5 moves leftward. Similarly, the door 7b is opened when the feed hopper 5 moves rightward when a roller 25b collides against frame 23b. The second embodiment is more advantageous than the first embodiment in that, when the product is to be fed to one chamber of the weigh hopper, it is possible to completely prevent some of the product scattered by the partition wall 11 from falling into the other chamber which would cause a measurement error.

Figure 12:
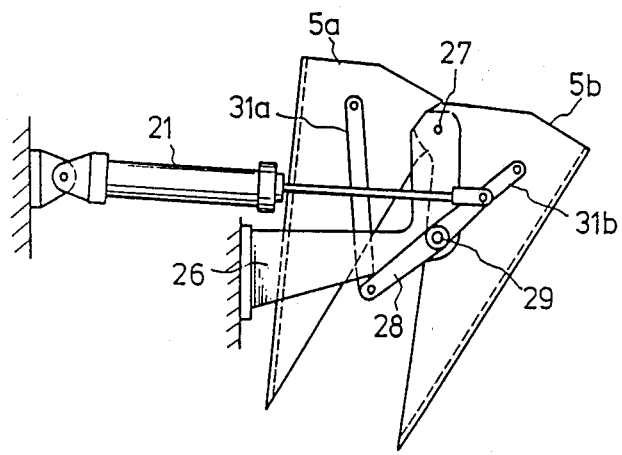
FIG. 12 is a front view of the feed hopper of FIGS. 9 and 10 actuated for unloading.
Figure 9:
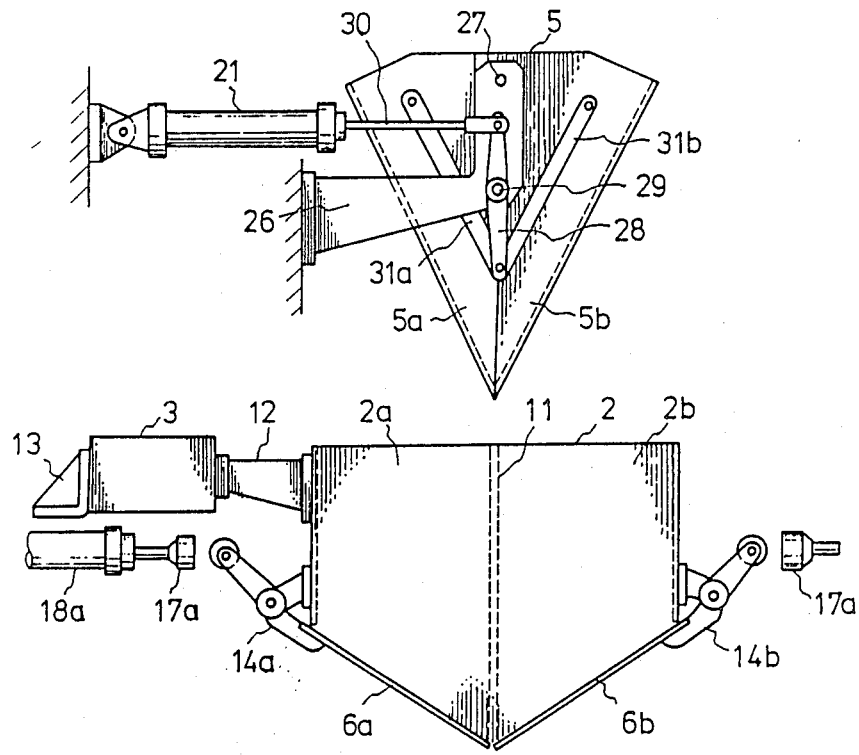
FIG. 9 is a front view of a third embodiment of the product feeding and weighing structure according to this invention.
Figure 10:
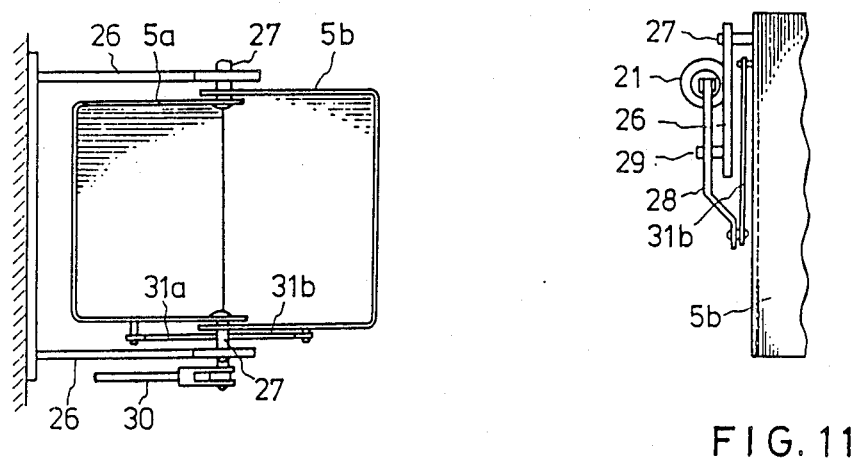
FIG. 10 is a plan view of the feed hopper of the embodiment of FIG. 9.
Figure 11:
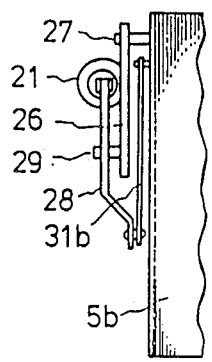
FIG. 11 is a partial side view representing an operating mechanism of the feed hopper of FIGS. 9 and 10.

FIGS. 9, 10 and 11 show a third embodiment of feed/weigh hopper set consisting of a weigh hopper 2 which is exactly same as those of the first and second embodiments but a feed hopper 5 which substantially differs in structure from those of the first and second embodiments. In this embodiment, the feed hopper 5 is divided into two symmetric halves 5a and 5b (although symmetry is not essential) which are hinged at their upper portions by a pair of pivots 27 supported by a pair of brackets 27 for pivotal movement of the feed hopper halves about a common generally horizontal axis. An actuating lever 28 is supported by one of two brackets 26 through a pivot 29 at its middle portion which aligns vertically with the pivot 27. The upper end of the lever 28 is coupled to a piston rod 30 of an air cylinder 21 and its lower end is pivoted together with the lower ends of a pair of links 31a and 31b. Links 31a and 31b are pivoted at their upper ends to upper portions of respective halves 5a and 5b of the feed hopper 5. This feed hopper structure is shown closed in FIG. 9 in its deactivated neutral position. As illustrated in FIG. 12, when the air cylinder 21 is extended to push lever 28, the feed hopper halves 5a, 5b are adapted to pivot to the left and to open to enable discharge of the content of the feed hopper into the left chamber 2a of the weigh hopper 2. When the air cylinder 21 is retracted to pull lever 28, the feed hopper halves 5a, 5b are adapted to pivot to the right and to open for loading the right chamber 2b of the weigh hopper.

Because the lower end of the feed hopper shown in FIG. 12 swings left- or rightward when it opens, this embodiment has the same advantage as the second embodiment i.e., preventing product from falling undesirably into the chamber not being loaded. Moreover, the structure is simpler since it has no loading gate door at its bottom.

What is claimed is:

1. A product feeding and weighing structure for a combination weighing machine, comprising a weigh hopper having a partition therein dividing the hopper into two chambers, a feed hopper disposed above the weigh hopper having discharge gate means adapted for opening to feed the contents of the feed hopper into either of the two chambers of the weigh hopper, and means for selectively effecting substantially linear horizontal movement of the feed hopper in one direction with respect to said partition for feeding the contents of the feed hopper through said discharge gate means into one chamber of the weighing hopper and in the opposite direction with respect to the partition for feeding the contents of the feed hopper through said discharge gate means into the other chamber of the weighing hopper.

2. A product feeding and weighing structure as set forth in claim 1 wherein said discharge gate means comprises a pair of discharge gates one of which is adapted to open to feed product into said one chamber of the weigh hopper and the other of which is adapted to open to feed product into the other chamber of the weigh hopper.

3. A product feeding and weighing structure for a combination weighing machine, comprising a weigh hopper having a partition therein dividing the hopper into two chambers, a feed hopper comprising a pair of normally closed hopper halves disposed above the weigh hopper, and means mounting the hopper halves for conjoint pivotal movement about a common generally horizontal axis between a first position in which the hopper halves are adapted to open for feeding of the contents of the feed hopper into one chamber of the weigh hopper and a second position in which the hopper halves are adapted to open for feeding of the contents of the feed hopper into the other chamber of the weigh hopper.

* * * * *

UNITED STATES PATENT AND TRADEMARK OFFICE
CERTIFICATE OF CORRECTION

PATENT NO. : 4,874,048

DATED : October 17, 1989

INVENTOR(S) : Shozo Kawanishi and Tadashi Higuchi

It is certified that error appears in the above-identified patent and that said Letters Patent is hereby corrected as shown below:

Column 2, line 19-20, "loacing", should read ---loading---.

Column 2, line 45, "type as shown", should read ---type shown---.

Column 2, line 47, "respective units", should read ---respective weighing units---.

Column 3, line 38-39, "the step", should read ---this step---.

Title page, left column, delete "Notice: The portion of the term of this patent subsequent to May 6, 2097 has been disclaimed."

Signed and Sealed this

Twenty-third Day of April, 1991

Attest:

HARRY F. MANBECK, JR.

Attesting Officer

Commissioner of Patents and Trademarks